United States Patent
Watts, III et al.

(10) Patent No.: US 10,267,177 B2
(45) Date of Patent: Apr. 23, 2019

(54) TURBINE ASSEMBLY HAVING A ROTOR SYSTEM LOCK

(71) Applicants: Rolls-Royce North American Technologies, Inc., Indianapolis, IN (US); Rolls-Royce Corporation, Indianapolis, IN (US)

(72) Inventors: Oran A. Watts, III, Indianapolis, IN (US); Larry A. Junod, Greencastle, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 696 days.

(21) Appl. No.: 15/016,813

(22) Filed: Feb. 5, 2016

(65) Prior Publication Data

US 2016/0230587 A1    Aug. 11, 2016

Related U.S. Application Data

(60) Provisional application No. 62/113,813, filed on Feb. 9, 2015.

(51) Int. Cl.
*F01D 21/00* (2006.01)
*F01D 25/24* (2006.01)
(Continued)

(52) U.S. Cl.
CPC .............. *F01D 21/00* (2013.01); *B64D 7/00* (2013.01); *F01D 5/02* (2013.01); *F01D 5/12* (2013.01); *F01D 9/041* (2013.01); *F01D 19/00* (2013.01); *F01D 25/24* (2013.01); *F02C 7/26* (2013.01); *F42B 15/00* (2013.01); *F05D 2220/32* (2013.01); *F05D 2230/60* (2013.01); *F05D 2260/30* (2013.01); *F05D 2260/311* (2013.01); *F05D 2260/85* (2013.01); *F05D 2260/99* (2013.01)

(58) Field of Classification Search
CPC ........ F01D 19/00; F01D 21/00; F01D 21/006; F01D 21/04; F01D 21/045; F01D 25/00; F01D 25/24; F01D 5/02; F01D 5/12; F01D 5/147; F01D 9/041; F02C 7/26; F05D 2260/02; F05D 2260/30; F05D 2260/311; F42B 15/00; F42B 8/12; B64F 5/50; B64C 39/02
USPC .......................................... 415/9, 123; 416/2
See application file for complete search history.

(56) References Cited

U.S. PATENT DOCUMENTS 2,982,093 A    5/1961    Belcher et al.
3,779,665 A    12/1973   Caldwell et al.
(Continued)

OTHER PUBLICATIONS

Extended European Search Report, European Application No. 16154368. 1-1607, dated Jun. 13, 2016, 7 pages.

*Primary Examiner* — Justin D Seabe
*Assistant Examiner* — Julian B Getachew
(74) *Attorney, Agent, or Firm* — Barnes & Thornburg LLP

(57) ABSTRACT

A rotor system lock for a gas turbine engine is described which blocks movement of rotating wheel assemblies relative to static vane assemblies in a gas turbine engine in order to block unintended rotation (or windmilling) of the gas turbine engine when it is exposed to high winds while at rest or to ram air during pre-launch flight and thereby avoid damage to components of the engine.

20 Claims, 3 Drawing Sheets

(51) Int. Cl.
    *F01D 9/04*      (2006.01)
    *F01D 5/02*      (2006.01)
    *F01D 5/12*      (2006.01)
    *F01D 19/00*     (2006.01)
    *F02C 7/26*      (2006.01)
    *F42B 15/00*     (2006.01)
    *B64D 7/00*      (2006.01)

(56) References Cited

U.S. PATENT DOCUMENTS

| | | | | |
|---|---|---|---|---|
| 4,193,739 | A * | 3/1980 | Lucey | F01D 25/34 |
| | | | | 415/118 |
| 4,664,539 | A | 5/1987 | Li | |
| 5,660,357 | A | 8/1997 | Grossman et al. | |
| 6,145,786 | A | 11/2000 | Baudu | |
| 7,097,413 | B2 | 8/2006 | VanDuyn | |
| 7,225,607 | B2 * | 6/2007 | Trumper | F01D 21/006 |
| | | | | 60/223 |
| 7,448,808 | B2 | 11/2008 | Bouchy | |
| 2007/0289310 | A1 | 12/2007 | Dooley et al. | |
| 2010/0047077 | A1 * | 2/2010 | Daniels | B64F 1/005 |
| | | | | 416/244 A |
| 2013/0011241 | A1 * | 1/2013 | Skaustein | F01D 25/285 |
| | | | | 415/123 |
| 2013/0163911 | A1 | 6/2013 | Antunes et al. | |

* cited by examiner

TURBINE ASSEMBLY HAVING A ROTOR SYSTEM LOCK

CROSS REFERENCE TO RELATED APPLICATIONS

This application claims priority to and the benefit of U.S. Provisional Patent Application No. 62/113,813, filed 9 Feb. 2015, the disclosure of which is now expressly incorporated herein by reference.

FIELD OF THE DISCLOSURE

The present disclosure relates generally to gas turbine engines, and more specifically to turbine assemblies having a rotor system lock.

BACKGROUND

Gas turbine engines typically include alternating stages of static vane assemblies and rotating wheel assemblies. The rotating wheel assemblies include disks carrying blades around their outer edges. These rotating wheel assemblies may be unintentionally turned (or windmilled) by the passage of air through the engine. Rotating components of a gas turbine engine can experience windmilling when wind flows through the engine while it is at rest due to high winds or during pre-launch flight due to ram air. This causes the rotor systems within the gas turbine engine to turn at undesired times and speeds which may damage components of the engine such as bearings, seals, and blades, among others.

SUMMARY

The present disclosure may comprise one or more of the following features and combinations thereof.

A turbine assembly for use in a gas turbine engine may include a case, a rotor mounted in the case to rotate relative to the case, and a fuse adapted to provide a rotor system lock that selectively blocks rotation of the rotor relative to the case. The case may include a support housing and a plurality of vanes coupled to the support housing. The rotor may include a wheel and a plurality of blades coupled to the wheel.

In some embodiments, the fuse may extend from at least one vane included in the case to at least one blade included in the rotor to block rotation of the rotor relative to the case. The fuse may disintegrate in response to the application of a predetermined current so that the rotor is allowed to rotate relative to the case.

In some embodiments, the fuse may include a first wrap that extends around at least one vane included in the case and at least one blade included in the rotor. The fuse may further include a second wrap spaced circumferentially from the first wrap that extends around at least one vane included in the case and at least one blade included in the rotor.

In some embodiments, the fuse may include a metallic wire, and the metallic wire may include a tin-based alloy. In some embodiments, the fuse may include a textile band, and the textile band may include carbon fiber. In some embodiments, the predetermined current for causing disintegration of the fuse may be less than 20 amps.

According to another aspect of the present disclosure, a turbine assembly for use in a gas turbine engine may include a case, a rotor mounted in the case to rotate relative to the case, and a fuse adapted to provide a rotor system lock that selectively blocks rotation of the rotor relative to the case. The case may include a support housing and a plurality of vanes coupled to the support housing. The rotor may include a wheel and a plurality of blades coupled to the wheel.

In some embodiments, the fuse may extend from the case to the rotor to block rotation of the rotor relative to the case. The fuse may disintegrate in response to the application of a predetermined current so that the rotor is allowed to rotate relative to the case.

In some embodiments, the turbine assembly may include an electrical power source coupled to the fuse to provide the predetermined current to the fuse. The electrical power source may be selected from one of a generator, a capacitor, and a battery.

In some embodiments, the fuse may include a first wrap that extends around at least one vane included in the case and at least one blade included in the rotor. The fuse may further include a second wrap spaced circumferentially from the first wrap that extends around at least one vane included in the case and at least one blade included in the rotor.

In some embodiments, the fuse may include a metallic wire that extends around a first vane and a first blade to provide the first wrap and a second metallic wire that extends around a second vane and a second blade to provide the second wrap. The first and the second metallic wire may include a tin-based alloy.

In some embodiments, the fuse may include a textile band that extends around a first vane and a first blade to provide the first wrap and a second metallic wire that extends around a second vane and a second blade to provide the second wrap. The first and the second textile band may include carbon fiber. In some embodiments, the predetermined current may be less than 20 amps.

According to another aspect of the present disclosure, an assembly for use in a gas turbine engine may include a case, a rotor mounted in the case to rotate relative to the case, and a fuse. The fuse may be adapted to provide a rotor system lock that selectively blocks rotation of the rotor relative to the case.

In some embodiments, the fuse may extends from the case to the rotor to block rotation of the rotor relative to the case. The fuse may disintegrate in response to the application of a predetermined current so that the rotor is allowed to rotate relative to the case.

In some embodiments, the fuse may include a first wrap that extends around a first component included in the case and a first component included in the rotor. The fuse may also include and a second wrap spaced circumferentially from the first wrap that extends around a second component included in the case and a second component included in the rotor.

In some embodiments, the fuse includes a metallic wire. The predetermined current for causing disintegration of the fuse may be less than 20 amps.

According to yet another aspect of the present disclosure, a method of making a turbine assembly may include mounting a rotor in a case for rotation relative to the case and fashioning a fuse between at least on blade included in the rotor and at least one vane included in the case to block rotation of the rotor relative to the case. The fuse may be made from a material that disintegrates in response to the application of a predetermined current so that the rotor is allowed to rotate relative to the case.

In some embodiments, the method may further include coupling an electrical power source to the fuse to provide the predetermined current to the fuse. The predetermined current may be less than 20 amps.

These and other features of the present disclosure will become more apparent from the following description of the illustrative embodiments.

DETAILED DESCRIPTION OF THE DRAWINGS

Figure 1:
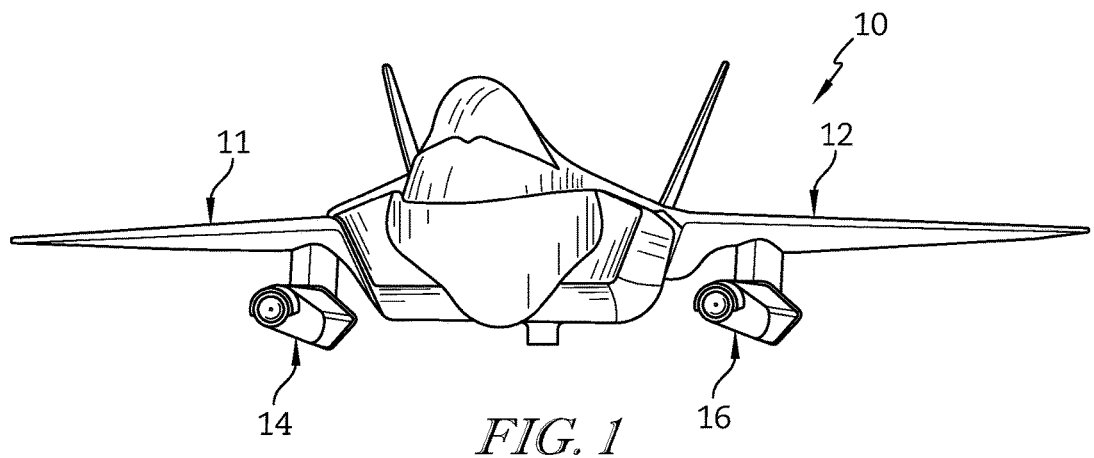
FIG. 1 is a perspective view of an aircraft and a pair of missiles mounted to the aircraft so that atmospheric air passes over and through the missiles during flight of the aircraft.

For the purposes of promoting an understanding of the principles of the disclosure, reference will now be made to a number of illustrative embodiments illustrated in the drawings and specific language will be used to describe the same.

Figure 2:
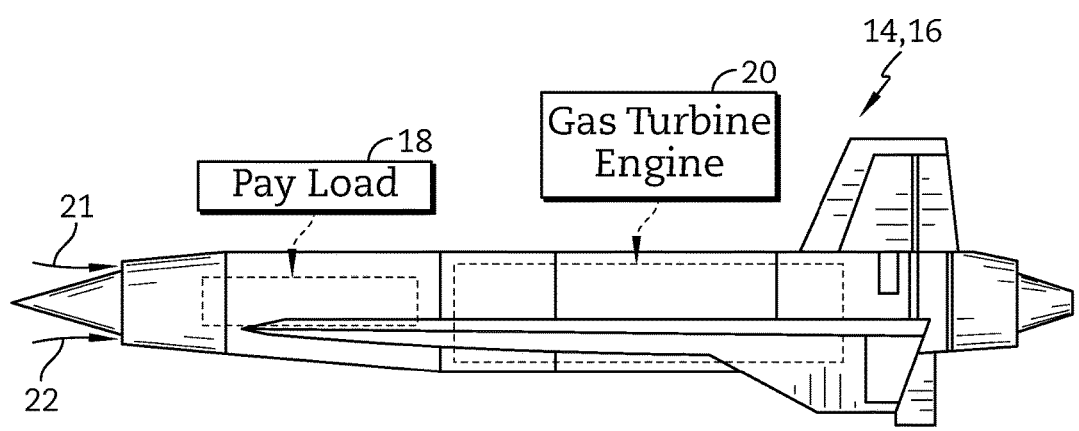
FIG. 2 is a side elevation view of one of the missiles of FIG. 1 showing diagrammatically that each missile includes a payload and a gas turbine engine adapted to propel the payload so that the missile may operate as an independent air vehicle when separated from the aircraft.

An aircraft 10 may include fixed wings 11, 12 under which may be suspended secondary air vehicles such as missiles 14, 16 as shown, for example, in FIG. 1. Other examples of secondary air vehicles include experimental aircraft, spacecraft, or any other air vehicle with rotating components that may be exposed to ram air during pre-launch flight. Each illustrative missile 14, 16 includes a payload 18 and a gas turbine engine 20. Air flows through the gas turbine engine 20 during ferrying of the missiles 14, 16 by the aircraft 10 as suggested by the arrows 21, 22 in FIG. 2. The air flowing through the gas turbine engine 20 may induce unintended rotation (or windmilling) of components included in the gas turbine engine 20 and may damage the gas turbine engine 20.

Figure 3:
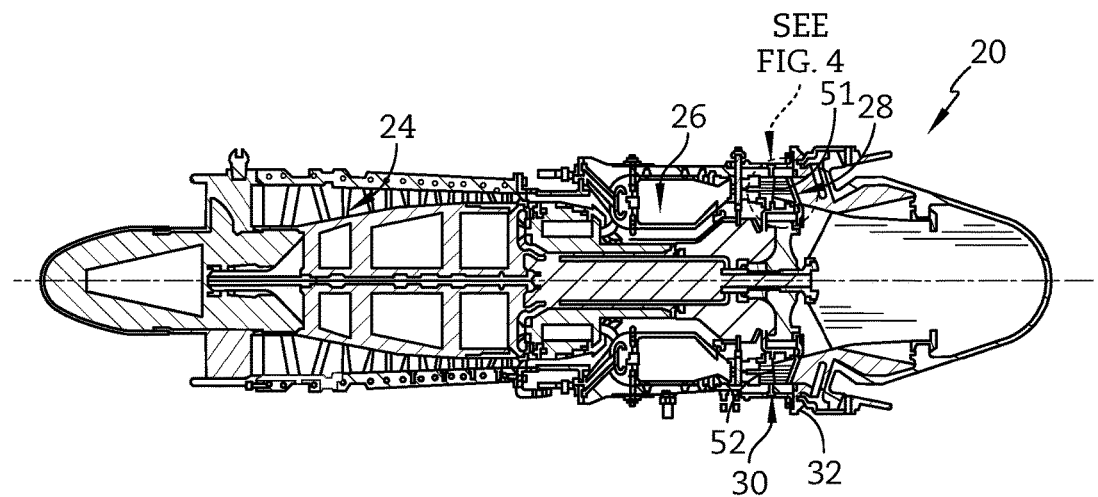
FIG. 3 is a cross-sectional view of a gas turbine engine that may be used in the missile of FIG. 2 showing that the gas turbine engine includes a compressor assembly, a combustor assembly, and a turbine assembly and showing that the turbine assembly includes a fuse that selectively blocks rotation of a rotor relative to a case while the missile is carried by the aircraft so that atmospheric air moving through the missile does not cause windmilling of the rotor relative to the case.

The illustrative gas turbine engine 20 of each missile 14, 16 includes a compressor assembly 24, a combustor assembly 26, and a turbine assembly 28 as shown in FIG. 3. The compressor assembly 24 compresses and delivers air to the combustor assembly 26. The combustor assembly 26 mixes fuel with the compressed air received from the compressor assembly 24 and ignites the fuel. The hot high pressure products of the combustion reaction in the combustor assembly 26 are directed into the turbine assembly 28 and the turbine assembly 28 extracts work to drive the compressor assembly 24 and exhausts thrust to propel the engine 20 as suggested in FIG. 3.

Figure 4:
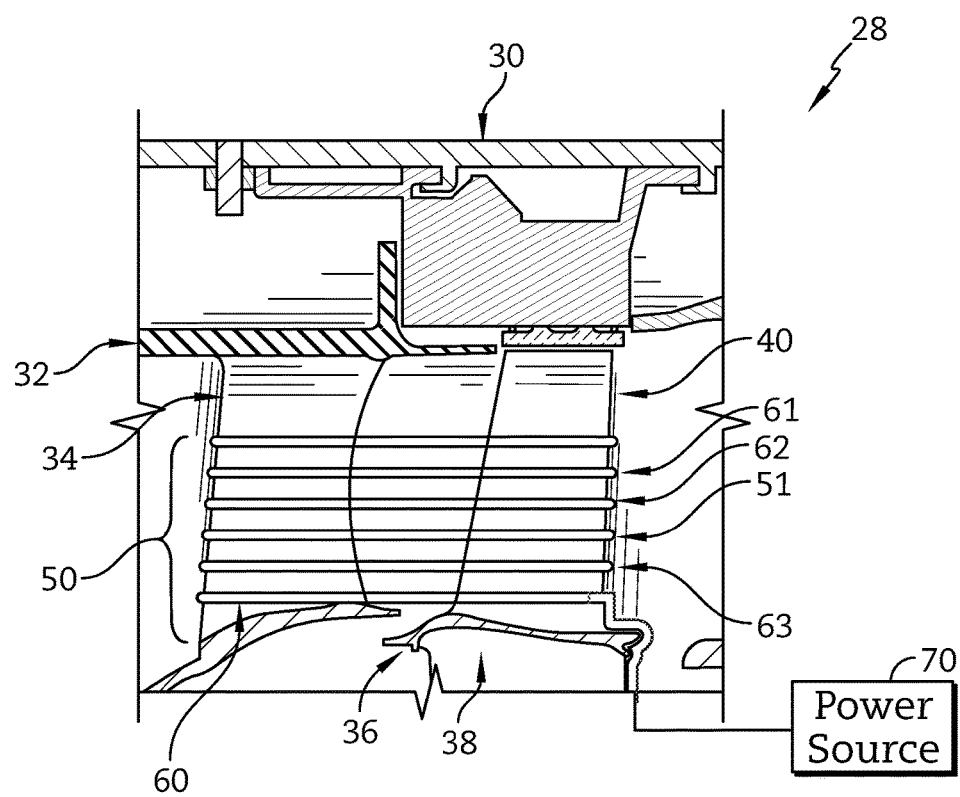
FIG. 4 is a detail view of a portion of the gas turbine engine of FIG. 3 showing that the fuse is wrapped around a vane included in the case and a blade included in the rotor to block rotation of the rotor and showing diagrammatically that the fuse is coupled to an electrical power source adapted to apply a current to the fuse to cause the fuse to disintegrate when the missile is separated from the aircraft allowing the turbine rotor to rotate relative to the turbine case and propel the missile.

The turbine assembly 28 illustratively includes a case 30 with a support housing 32, and a plurality of vanes 34 coupled to the support housing 32, as shown in FIGS. 3 and 4. A rotor 36 may be mounted in the case 30 to rotate relative to the case 30 and may include a wheel 38 and a plurality of blades 40. The vanes 34 of the case 30 may extend across the flow path of the hot, high-pressure combustion products from the combustor assembly 26 to direct the combustion products toward the blades 40 of the rotor 36. The blades 40 may in turn be pushed by the combustion products to cause the rotor 36 to rotate and thereby drive the rotating components of the compressor assembly 24.

The illustrative turbine assembly 28 includes a fuse 50 that provides a rotor system lock adapted to block unintended rotation (or windmilling) of components in the gas turbine engine 20 as suggested in FIG. 4. The illustrative fuse 50 extends from at least one of the plurality of vanes 34 included in the case 30 to at least one blade 40 included in the rotor 36, as shown in FIG. 4. The fuse 50 may include a plurality of wraps 51, 52 spaced circumferentially from one another that each extend around one or more vanes 34 and one or more blades 40 in order to block rotation of the rotor 36 relative to the case when air flows over the blades when the engine is not in operation, for example, when the engine 20 is ferried in a missile 14, 16 by the aircraft 10. The number of wraps 51, 52 included in the fuse will be dependent on the operating conditions of the gas turbine engine 20, and should be sufficient to block rotation of the rotor 36 relative to the case 30 during periods when the gas turbine engine 20 is experiencing conditions that may cause unintentional rotation or windmilling.

The fuse 50 may also reduce the potential for foreign object damage (FOD) to the gas turbine engine 20 before or after release of the illustrative missiles 14, 16 from the aircraft 10. In other embodiments, the fuse 50 may extend from other rotating components in the engine 20 to other static components in the engine 20 to block unintended rotation. For example, the fuse 50 may extend around or between compressor vanes and compressor blades; between sump housings and rotor shafts; or between any other suitable combination of static and dynamic structure within the engine 20. Further, in other embodiments the fuse 50 may be shaped and/or manufactured in various forms other than into wraps 51, 52 to engage components of the engine 20. For example, the fuse 50 may form one or more hooks, welds, buttons, or other connection features to engage components of the engine 20.

In the illustrated embodiment, each wrap 51, 52 includes a metallic wire 60 that forms a plurality of loops 61, 62, 63 as shown in FIG. 4. In the illustrative example, the metallic wire 60 is made from a eutectic tin-based alloy adapted to melt in response to the application of an electrical current. In other embodiments, the wire 60 may be made from other suitable materials. In other embodiments, each wrap 51, 52 may include a textile band. The textile band may be made from a carbon-fiber material or another suitable material adapted to burn or break down in response to the application of an electrical current.

The turbine assembly 20 may also include an electrical power source 70 as shown diagrammatically in FIG. 4. The power source 70 is coupled to the fuse 50 and is configured to apply a predetermined current to the fuse 50. Upon application of the predetermined current, the fuse 50 disintegrates (melts, burns, or otherwise breaks down to a weakened or broken state) to free the blades 40 from the vanes 34 and allow the rotor 36 to move relative to the case 30.

The electrical power source 70 may be a generator, a capacitor, or a battery adapted to apply 20 amps or less to the fuse 50. The power source 70 is configured to provide a predetermined electrical current to the fuse during engine start-up so that the gas turbine engine may operate normally upon release of a missile 14, 16 from the aircraft 10, or in response to a use input. The predetermined electrical current sufficient to cause the fuse to disintegrate may illustratively be 1 to 50 amperes.

Figure 5:
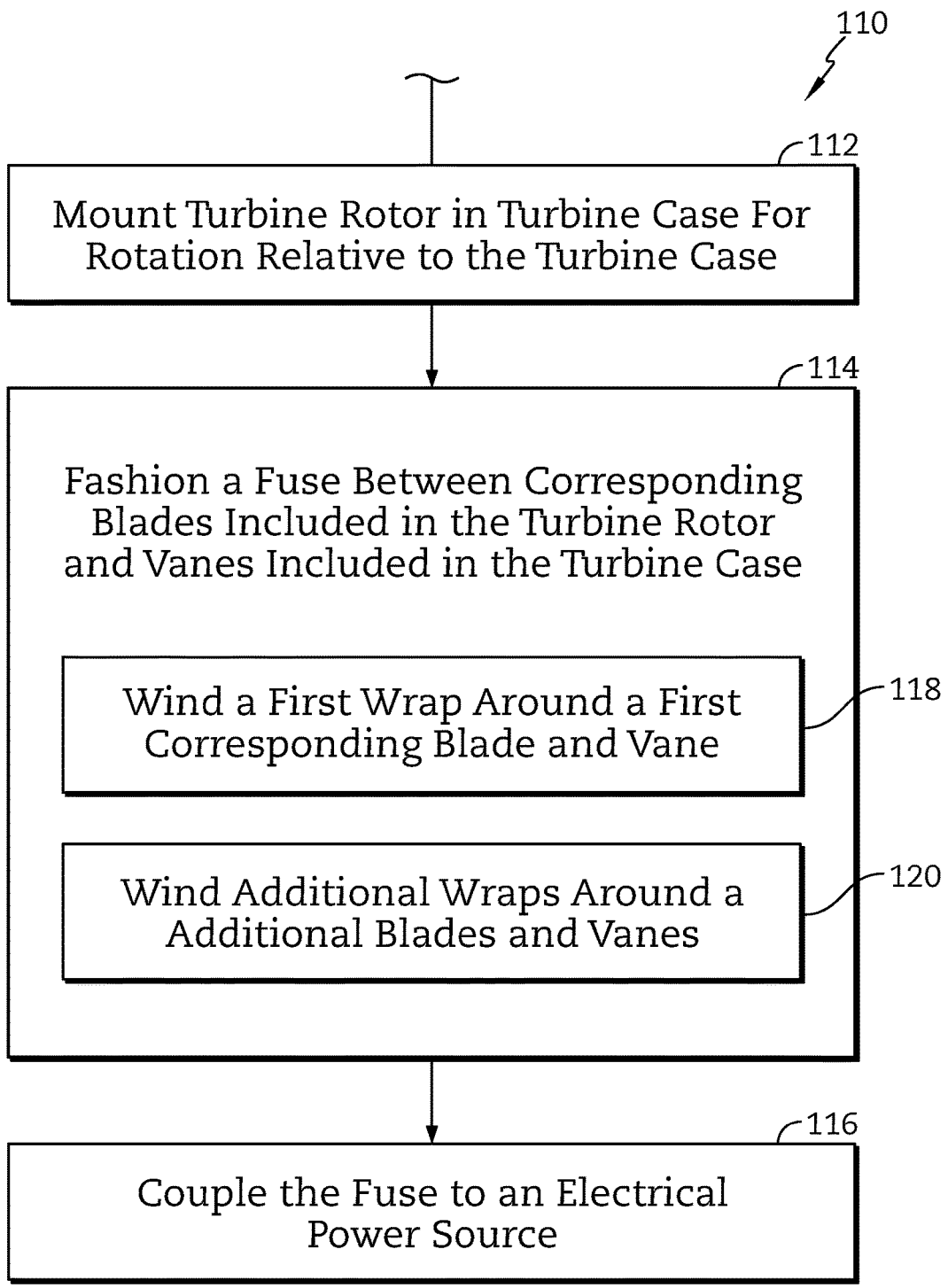
FIG. 5 is a block diagram showing a method of making the turbine assembly shown in FIGS. 3 and 4.

Referring now to FIG. 5, a method 110 of making a turbine assembly may include a step 112 of mounting a turbine rotor in a turbine case for rotation relative to the turbine case, followed by a step 114 of fashioning a fuse between corresponding blades included in the turbine rotor and vanes included in the turbine case. The method may also include a step 116 of coupling the fuse to an electrical power source.

The step 114 of fashioning a fuse may include a step 118 of winding a first wrap around a first corresponding blade and vane as shown in FIG. 5. The step 114 may also include a step 120 of winding additional wraps around additional vanes and blades as necessary.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly for use in a gas turbine engine, the assembly comprising
   a case including a support housing and a plurality of vanes coupled to the support housing,
   a rotor mounted in the case to rotate relative to the case, the rotor including a wheel and a plurality of blades coupled to the wheel, and
   a fuse that extends from at least one vane of the plurality of vanes included in the case to at least one blade of the plurality of blades included in the rotor to block rotation of the rotor relative to the case and that is configured to disintegrate in response to the application of a predetermined current so that the rotor is allowed to rotate relative to the case.

2. The turbine assembly of claim 1, wherein the fuse includes a first wrap that extends around the at least one vane of the plurality of vanes included in the case and the at least one blade of the plurality of blades included in the rotor.

3. The turbine assembly of claim 2, wherein the fuse includes a second wrap spaced circumferentially from the first wrap, the second wrap extending around a second vane of the plurality of vanes circumferentially spaced from the at least one vane of the plurality of vanes included in the case and a second blade of the plurality of blades spaced circumferentially from the at least one blade of the plurality of blades included in the rotor.

4. The turbine assembly of claim 1, wherein the fuse includes a metallic wire.

5. The turbine assembly of claim 4, wherein the metallic wire includes a tin-based alloy.

6. The turbine assembly of claim 1, wherein the fuse includes a textile band.

7. The turbine assembly of claim 6, wherein the textile band includes carbon fiber.

8. The turbine assembly of claim 1, wherein the predetermined current is less than 20 amps.

9. An assembly for use in a gas turbine engine, the assembly comprising
   a case,
   a rotor mounted in the case to rotate relative to the case, and
   a fuse that extends from the case to the rotor to block rotation of the rotor relative to the case and that is configured to disintegrate in response to the application of a predetermined current so that the rotor is allowed to rotate relative to the case.

10. The assembly of claim 9, further comprising an electrical power source coupled to the fuse to provide the predetermined current to the fuse.

11. The assembly of claim 10, wherein the electrical power source is selected from one of a generator, a capacitor, and a battery.

12. The assembly of claim 9, wherein the fuse includes a first wrap that extends around at least one vane included in the case and at least one blade included in the rotor.

13. The assembly of claim 12, wherein the fuse includes a second wrap spaced circumferentially from the first wrap, the second wrap extending around a second vane of the plurality of vanes spaced apart circumferentially from the at least one vane included in the case and a second blade of the plurality of blades spaced apart circumferentially from the at least one blade included in the rotor.

14. The assembly of claim 13, wherein the fuse includes a metallic wire that extends around a first vane included in the at least one vane of the case and a first blade included in the at least one blade of the rotor to provide the first wrap and a second metallic wire that extends around the second vane of the plurality of vanes spaced apart circumferentially from the at least one vane of the case and the second blade of the plurality of blades spaced apart circumferentially from the at least one blade of the rotor to provide the second wrap.

15. The assembly of claim 13, wherein the fuse includes a textile band that extends around a first vane included in the at least one vane of the case and a first blade included in the at least one blade of the rotor to provide the first wrap and a second textile band that extends around the second vane of the plurality of vanes spaced apart circumferentially from the at least one vane of the case and the second blade of the plurality of blades spaced apart circumferentially from the at least one blade of the rotor to provide the second wrap.

16. The assembly of claim 9, wherein the predetermined current is less than 20 amps.

17. A method of making a turbine assembly, the method comprising
   mounting a rotor in a case for rotation relative to the case, and
   fashioning a fuse between the rotor and the case to block rotation of the rotor relative to the case,
   wherein the fuse is made from a material that disintegrates in response to the application of a predetermined current so that the rotor is allowed to rotate relative to the case.

18. The method of claim 17, further comprising coupling an electrical power source to the fuse to provide the predetermined current to the fuse.

19. The method of claim 17, wherein the predetermined current is less than 20 amps.

20. The method of claim 17, wherein the fuse includes a first wrap extending from the case to the rotor and a second wrap spaced circumferentially from the first wrap, the second wrap extending from the case to the rotor.

* * * * *